(12) United States Patent
Liu et al.

(10) Patent No.: US 11,463,476 B2
(45) Date of Patent: Oct. 4, 2022

(54) CHARACTER STRING CLASSIFICATION METHOD AND SYSTEM, AND CHARACTER STRING CLASSIFICATION DEVICE

(71) Applicant: GUANGDONG UNIVERSITY OF TECHNOLOGY, Guangdong (CN)

(72) Inventors: Wenyin Liu, Guangdong (CN); Zhenguo Yang, Guangdong (CN); Huaping Yuan, Guangdong (CN); Xu Chen, Guangdong (CN); Yukun Li, Guangdong (CN)

(73) Assignee: GUANGDONG UNIVERSITY OF TECHNOLOGY, Guangdong (CN)

( * ) Notice: Subject to any disclaimer, the term of this patent is extended or adjusted under 35 U.S.C. 154(b) by 597 days.

(21) Appl. No.: 16/482,256

(22) PCT Filed: Jan. 17, 2018

(86) PCT No.: PCT/CN2018/072999
§ 371 (c)(1),
(2) Date: Jul. 31, 2019

(87) PCT Pub. No.: WO2019/085275
PCT Pub. Date: May 9, 2019

(65) Prior Publication Data
US 2019/0349399 A1    Nov. 14, 2019

(30) Foreign Application Priority Data
Oct. 31, 2017    (CN) .......................... 201711046466.5

(51) Int. Cl.
*H04L 29/06*    (2006.01)
*H04L 9/40*    (2022.01)
(Continued)

(52) U.S. Cl.
CPC ........ *H04L 63/1483* (2013.01); *G06F 16/353* (2019.01); *G06F 16/9566* (2019.01);
(Continued)

(58) Field of Classification Search
CPC . H04L 63/1483; G06F 16/353; G06F 16/9566
See application file for complete search history.

(56) References Cited

U.S. PATENT DOCUMENTS

| 7,711,673 | B1 * | 5/2010 | Diao ..................... G06F 40/126 706/62 |
| 2015/0200963 | A1 * | 7/2015 | Geng .................. H04L 63/1483 726/22 |
| 2018/0096144 | A1 | 4/2018 | Pan et al. |

FOREIGN PATENT DOCUMENTS

| CN | 101872347 A | 10/2010 |
| CN | 102708186 A | 10/2012 |

(Continued)

OTHER PUBLICATIONS

International Search Report for PCT/CN2018/072999 dated Aug. 6, 2018, ISA/CN.
(Continued)

*Primary Examiner* — Wasika Nipa
(74) *Attorney, Agent, or Firm* — Yue (Robert) Xu; Apex Attorneys at law, LLP

(57) ABSTRACT

A character string classification method, a character string classification system, a character string classification device, and a computer readable storage medium are provided. The method includes: acquiring a to-be-classified character string, inputting the to-be-classified character string to a feature extractor to obtain a feature vector of the to-be-classified character string, and inputting the feature vector to a classifier to obtain a classification result of the to-be-classified character string. With the character string classification method, only the features of the character string
(Continued)

itself are used in the character string classification process. That is, the to-be-classified character string is directly inputted to the feature extractor to obtain the feature vector, and the classifier classifies the to-be-classified character string based on the feature vector, thereby eliminating requirement for other information associated with the character string.

13 Claims, 7 Drawing Sheets

(51) Int. Cl.
    *G06F 16/35*     (2019.01)
    *G06F 16/955*     (2019.01)
    *G06N 20/00*     (2019.01)
    *G06F 40/30*     (2020.01)

(52) U.S. Cl.
    CPC ............ *G06F 40/30* (2020.01); *G06N 20/00* (2019.01); *H04L 63/1416* (2013.01)

(56) References Cited

FOREIGN PATENT DOCUMENTS

| | | |
|---|---|---|
| CN | 102739679 A | 10/2012 |
| CN | 102790762 A | 11/2012 |
| CN | 104573033 A | 4/2015 |
| CN | 105956472 A | 9/2016 |
| CN | 106156120 A | 11/2016 |
| CN | 106709345 A | 5/2017 |

OTHER PUBLICATIONS

The 1st Office Action dated Jan. 4, 2021 for the Chinese Patent Application No. CN2017110464665.

\* cited by examiner

CHARACTER STRING CLASSIFICATION METHOD AND SYSTEM, AND CHARACTER STRING CLASSIFICATION DEVICE

The present application is the national phase of International Patent Application No. PCT/CN2018/072999, titled "CHARACTER STRING CLASSIFICATION METHOD AND SYSTEM, AND CHARACTER STRING CLASSIFICATION DEVICE", filed on Jan. 17, 2018, which claims the priority to Chinese Patent Application No. 201711046466.5, titled "CHARACTER STRING CLASSIFICATION METHOD AND SYSTEM, AND CHARACTER STRING CLASSIFICATION DEVICE", filed on Oct. 31, 2017 with the Chinese Patent Office, both of which are incorporated herein by reference in their entireties.

TECHNICAL FIELD

The present disclosure relates to the field of text processing technologies, and in particular to a character string classification method, a character string classification system, a character string classification device, and a computer readable storage medium.

BACKGROUND

The text processing technology may be applied to various technical fields, such as technical fields of phishing network detection, malicious network request detection, and document classification. With the rapid development of the internet application technology in China, network security faces enormous threat, and various malicious network requests are emerging out. Phishing mainly occurs in some financial websites and e-commerce websites, and huge loss has been caused due to the endless emerging means for phishing and the rapid spread of phishing. Therefore, phishing has become one of the most severe internet fraud means, which is spread quickly and is widely misused, and seriously hamper the healthy development of online finance and e-commerce.

In most conventional character string classification methods, other information associated with the character strings is usually required to extract features. For example, in order to detect whether a website is a phishing website, not only the URL address character string is used, but also information of a webpage of the website is required. In some other methods, even information of multiple layers of web pages is required. In this case, it is required to acquire the information of the webpage by accessing the webpage in an actual application, thus the detection cannot be performed in real-time once the network is in a poor state. In a conventional character string classification method based on a machine-learning algorithm, it is usually required to determine a feature extraction manner in conjunction with artificial experiences, which requires knowledge of an expert in this field. In addition, different feature extraction manners may be determined for different problems to be solved, which results in redundant steps. Moreover, the artificially determined feature extraction manner is performed based on a specific data set, which may bring in a subjective factor, thereby resulting in a limited model performance.

Therefore, an issue to be solved by those skilled in the art is how to provide a character string classification method, with which features are extracted automatically and only features of the character string itself are used in the character string classification process, thereby eliminating requirement for other information associated with the character strings.

SUMMARY

A character string classification method, a character string classification system, a character string classification device, and a computer readable storage medium are provided according to the present disclosure, with which only features of a character string itself are used in a character string classification the process, thereby eliminating requirement for other information associated with the character string.

A character string classification method is provided according to an embodiment of the present disclosure, which includes:

acquiring a to-be-classified character string;

inputting the to-be-classified character string to a feature extractor, to obtain a feature vector of the to-be-classified character string; and inputting the feature vector to a classifier, to obtain a classification result of the to-be-classified character string.

The inputting the to-be-classified character string to the feature extractor, to obtain the feature vector of the to-be-classified character string includes:

inputting the to-be-classified character string to the feature extractor;

dividing, by the feature extractor, the to-be-classified character string into N character string sub-segments in a predetermined division manner, and selecting, by the feature extractor, M character string sub-segments from the N character string sub-segments, where N indicates a positive integer, and M indicates a positive integer not greater than N;

inputting, by the feature extractor, the M character string sub-segments to a trained C2V model, to generate a feature matrix of each of the M character string sub-segments, where each row of the feature matrix represents an n-dimensional feature vector of one character in the character string sub-segment, each column of the feature matrix represents one dimension of the n-dimensional feature vector, and n indicates a positive integer; and calculating, by the feature extractor, a statistical feature value for each column of the feature matrix of each of the M character string sub-segments with a statistical method, to obtain a statistical feature vector of the character string sub-segment, and generating, by the feature extractor, the feature vector of the to-be-classified character string based on all statistical feature vectors of the M character string sub-segments.

The statistical method includes at least one of a mean value calculating method, a standard deviation method, and a median calculating method.

The generating the feature vector of the to-be-classified character string based on all the statistical feature vectors of the M character string sub-segments includes:

linking all the statistical feature vectors in series to generate the feature vector of the to-be-classified character string.

Before the inputting the M character string sub-segments to the trained C2V model, the character string classification method further includes:

segmenting all character strings in a training set into characters, and inputting all the characters to a character corpus; and training a Character Embedding model by using the characters in the character corpus in a Word2vec training manner, to obtain the trained C2V model.

In a case that the to-be-classified character string represents a URL address of a website and it is to be detected whether the website is phishing website, and N is 5, the dividing the to-be-classified character string into the N character string sub-segments in the predetermined division manner includes:

dividing the URL address into five character string sub-segments respectively representing a network protocol, a sub-domain name field, a domain name field, a domain name suffix, and a URL path.

In a case that the to-be-classified character string represents a network request and it is to be detected whether the network request is a malicious request or indicates a website backdoor behavior, and M is 2, the dividing the to-be-classified character string into the N character string sub-segments in the predetermined division manner and selecting the M character string sub-segments from the N character string sub-segments includes:

dividing the network request into the N character string sub-segments in the predetermined division manner, and selecting a character string sub-segment representing a request path and a character string sub-segment representing a request parameter from the N character string sub-segments, where N indicates an integer not less than 2.

In a case that the to-be-classified character string represents a network request and it is to be detected whether the network request is a malicious request or indicates a website backdoor behavior, the inputting the to-be-classified character string to the feature extractor to obtain the feature vector of the to-be-classified character string includes:

inputting the network request to a trained C2V model, to generate a feature matrix of a network request.

In a case that the to-be-classified character string represents a to-be-classified document, the inputting the to-be-classified character string to the feature extractor includes:

inputting all the characters of the to-be-classified document to the feature extractor.

The dividing the to-be-classified character string into the N character string sub-segments in the predetermined division manner includes:

grouping all the characters into N character string sub-segments based on spaces and/or punctuations.

The classifier is trained through a machine learning algorithm.

The machine learning algorithm includes at least one of an XGBoost algorithm, a GBDT algorithm, or a neural network algorithm.

A character string classification system is further provided according to an embodiment of the present disclosure, which includes an acquiring module, an extracting module and a classifying module. The acquiring module is configured to acquire a to-be-classified character string. The extracting module is configured to input the to-be-classified character string to a feature extractor to obtain a feature vector of the to-be-classified character string. The classifying module is configured to input the feature vector to a classifier to obtain a classification result of the to-be-classified character string.

The extracting module includes an inputting unit, a dividing unit, a feature unit and a generating unit. The inputting unit is configured to input the to-be-classified character string to a feature extractor. The dividing unit is configured to divide the to-be-classified character string into N character string sub-segments in a predetermined division manner, and select M character string sub-segments from the N character string sub-segments, where N indicates a positive integer, and M indicates a positive integer not greater than N. The feature unit is configured to input the M character string sub-segments to a trained C2V model to generate a feature matrix of each of the M character string sub-segments, where each row of the feature matrix represents an n-dimensional feature vector of one character in the character string sub-segment, each column of the feature matrix represents one dimension of the n-dimensional feature vector, and n indicates a positive integer. The generating unit is configured to calculate a statistical feature value for each column of the feature matrix of each of the M character string sub-segments with a statistical method to obtain a statistical feature vector of the character string sub-segment, and generate the feature vector of the to-be-classified character string based on all statistical feature vectors of the M character string sub-segments.

The extracting module further includes a segmenting unit and a training unit. The segmenting unit is configured to segment all character strings in a training set into characters, and input all the characters to a character corpus. The training unit is configured to train a Character Embedding model by using the characters in the character corpus in a Word2vec training manner, to obtain the trained C2V model.

A character string classification device is further provided according to an embodiment of the present disclosure, which includes a memory and a processor. The memory is configured to store a character string classification program. The processor is configured to perform, when executes the character string classification program, steps of the character string classification method as described above.

A computer readable storage medium is further provided according to an embodiment of the present disclosure, which has a character string classification program stored thereon. The character string classification program, when executed by a processor, configures the processor to perform the character string classification method described above.

In view of the above, the character string classification method according to the embodiments of the present disclosure includes: acquiring a to-be-classified character string; inputting the to-be-classified character string to a feature extractor to obtain a feature vector of the to-be-classified character string; and inputting the feature vector to a classifier to obtain a classification result of the to-be-classified character string. It can be seen that, with the character string classification method according to the embodiments of the present disclosure, only the features of the character string itself are used in the character string classification process. That is, the to-be-classified character string is directly inputted to the feature extractor to obtain the feature vector, and the classifier classifies the to-be-classified character string based on the feature vector, thereby eliminating requirement for other information associated with the character string. A character string classification system, a character string classification device, and a computer readable storage medium are further provided according to the present disclosure, which can also achieve the above technical effects.

BRIEF DESCRIPTION OF THE DRAWINGS

In order to describe the technical solutions in the embodiments of the present disclosure or in the conventional art more clearly, drawings to be used in the description of the embodiments or the conventional art are described briefly. Apparently, the drawings described below only show some of embodiments of the present disclosure, and for those skilled in the field, other drawings may be obtained from these drawings without any creative effort.

DETAILED DESCRIPTION OF THE EMBODIMENTS

The technical solutions according to the embodiments of the present disclosure are described clearly and completely hereinafter with reference to the drawings in embodiments of the present disclosure. Apparently, the described embodiments are only some rather than all of the embodiments of the present disclosure. Based on the embodiments of the present disclosure, all other embodiments obtained by those skilled in the art without any creative effort should fall within the protection scope of the present disclosure.

A character string classification method is provided according to an embodiment of the present disclosure, with which only features of a character string itself are used in a character string classification process, thereby eliminating requirement for other information associated with the character string.

Figure 1:
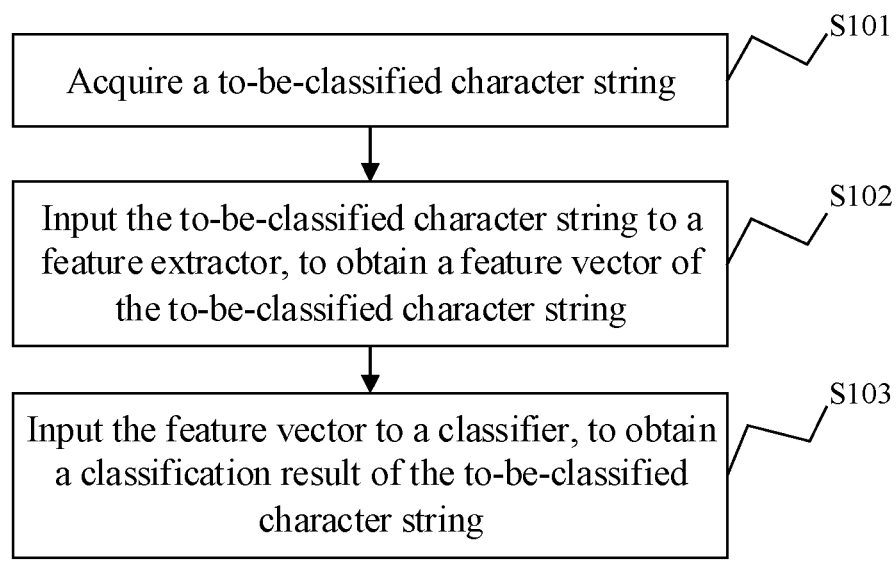
FIG. 1 is a flow chart of a character string classification method according to an embodiment of the present disclosure.

Reference is made to FIG. 1, which is a flow chart of a character string classification method according to an embodiment of the present disclosure. As shown in FIG. 1, the character string classification method includes the following steps S101 to S103.

In S101, a to-be-classified character string is acquired.

In an implementation, the to-be-classified character string may be inputted by a user at a terminal, or may be recorded in a document and provided in a form of the document, or may be acquired in other ways. For example, a URL address or a character string of another type carried by a two-dimensional code may be acquired by scanning the two-dimensional code, or the to-be-classified character string may be acquired by automatically intercepting various communications, for example, a network request character string may be captured by a network firewall. Herein, the manner of acquiring the to-be-classified character string is not specifically defined.

In S102, the to-be-classified character string is inputted to a feature extractor, to obtain a feature vector of the to-be-classified character string.

This step is performed to extract the feature vector of the to-be-classified character string, for a classifier to classify the to-be-classified character string based on the feature vector of the to-be-classified character string in a subsequent step.

In S103, the feature vector is inputted to a classifier, to obtain a classification result of the to-be-classified character string.

In an implementation, the classifier is trained through a machine learning algorithm. The machine learning algorithm may be an XGBoost algorithm, a GBDT algorithm, a neural network algorithm, and the like, the type of which is not defined herein.

With the character string classification method according to the embodiment of the present disclosure, only the features of the character string itself are used in the character string classification process. That is, the to-be-classified character string is directly inputted to the feature extractor to obtain the feature vector, and the classifier classifies the to-be-classified character string based on the feature vector, thereby eliminating the requirement for other information associated with the to-be-classified character string.

A character string classification method is further provided according to another embodiment of the present disclosure. Compared with that of the above embodiment, the technical solution is further illustrated and optimized in the present embodiment.

Figure 2:
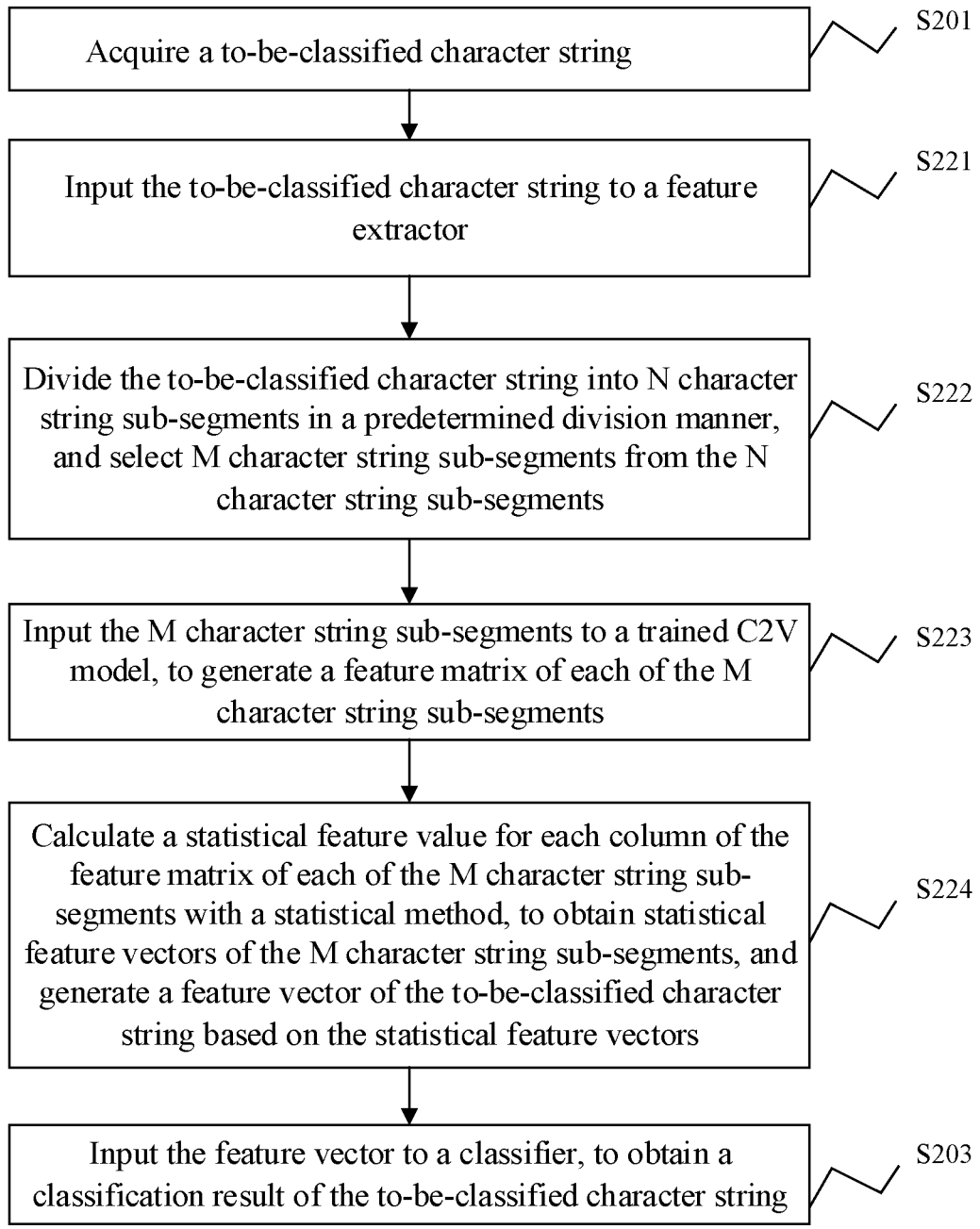
FIG. 2 is a flow chart of a character string classification method according to another embodiment of the present disclosure.

Reference is made to FIG. 2, which is a flow chart of a character string classification method according to another embodiment of the present disclosure. As shown in FIG. 2, the character string classification includes the following steps S201, S221 to S224, and S203.

In S201, a to-be-classified character string is acquired.

In S221, the to-be-classified character string is inputted to a feature extractor.

In S222, the feature extractor divides the to-be-classified character string into N character string sub-segments in a predetermined division manner, and selects M character string sub-segments from the N character string sub-segments, where N indicates a positive integer, and M indicates a positive integer not greater than N.

In order to perform an accurate character string classification, the to-be-classified character string is divided into N parts, that is, the N character string sub-segments, in the predetermined division manner, and the M character string sub-segments are selected from the N character string sub-segments. All of the character string sub-segments may be selected to construct a feature vector, that is, N=M, or several of the character string sub-segments may be selected to construct the feature vector. The ways for division and selection are not defined here.

In S223, the feature extractor inputs the M character string sub-segments to a trained C2V model, to generate a feature matrix of each of the M character string sub-segments. Each row of the feature matrix represents an n-dimensional feature vector of one character in the character string sub-segment, and each column of the feature matrix represents one dimension of the n-dimensional feature vector, where n indicates a positive integer.

In an implementation, the feature matrix of each of the character string sub-segments is generated by using the trained C2V model. Each row of the feature matrix represents an n-dimensional feature vector of one character in the character string sub-segment, and each column of the feature matrix represents one dimension of the n-dimensional feature vector, where n indicates a positive integer.

In S224, the feature extractor calculates a statistical feature value of each column of the feature matrix of each of the M character string sub-segments with a statistical method, to obtain a statistical feature vector of the character string sub-segment, and generates a feature vector of the to-be-classified character string based on all statistical feature vectors of the M character string sub-segments.

The manner of generating the feature vector is not defined in the embodiment, all the statistical feature vectors may be linked in series to generate the feature vector, or all the statistical feature vectors may be averaged to generate the feature vector, or the feature vector may be generated by those skilled in the art in other manners based on practical experiences.

It is to be noted that, in order to ensure that the feature vector of the to-be-classified character string reflects and maintains the original sequence of characters in the to-be-classified character string, N and M may be set to be equal to a maximum length of the to-be-classified character string. That is, each of the character string sub-segments has a length of 1 and contains only one character, only the first N characters are selected for a to-be-classified character string having a length longer than N, and a to-be-classified character string having a length less than N is complemented to have a length of N with null characters. Therefore, in this step, all the statistical feature vectors are linked in series to generate the feature vector, that is, the n-dimensional feature vectors of the characters are linked in series to generate the feature vector of the to-be-classified character string, thereby reflecting and maintaining the original sequence of the characters in the to-be-classified character string.

In S203, the feature vector is inputted to a classifier, to obtain a classification result of the to-be-classified character string.

Based on the above embodiments, in a preferred embodiment, the statistical method includes at least one of a mean value calculating method, a standard deviation calculating method, and a median calculating method.

The statistical method is not specifically defined in the present disclosure, which may be any one of the mean value calculating method, the standard deviation calculating method, and the median calculating method. In addition, other statistical methods may be used by those skilled in the art according to actual experiences.

Based on the above embodiments, in a preferred embodiment, the generating the feature vector of the to-be-classified character string based on all the statistical feature vectors includes:

linking all the statistical feature vectors in series to generate the feature vector of the to-be-classified character string.

In an implementation, the linking step includes: calculating a statistical feature value for each column of the feature matrix obtained above to obtain a vector of V=(1, n) of each of the character string sub-segments, and linking the N vectors in series to form one vector, that is, vector=$V_1 \cup V_2 \cup \ldots \cup V_N$, where vector indicates a one-dimensional vector of (1, Nn), that is, the feature vector.

Based on the above embodiments, in a preferred embodiment, before the inputting the M character string sub-segments to the trained C2V model, the character string classification method further includes:

segmenting all character strings in a training set into characters, and inputting the characters to a character corpus; and training a Character Embedding model by using the characters in the character corpus in a Word2vec training manner, to obtain the trained C2V model.

Word2vec is an efficient training manner for characterizing a word as a real-value vector which is opened by Google company in 2013. By the Word2vec training manner based on the idea of deep learning, text content may be processed in a simple way of a vector operation in a K-dimensional vector space, and a similarity among vector spaces may be used to represent a similarity of text semantics. A word vector generated in the Word2vec training manner may be used for many operations related to natural language understanding, such as operations of clustering, synonyms finding, and part-of-speech analysis.

It is to be noted that, a Word2vec training manner may also achieves the same effect as the Doc2vec training manner. Specifically, tests are performed respectively using the CBOW training algorithm and the skip-gram training algorithm in Word2vec, and it is found that a better effect may be achieved with the skip-gram training algorithm.

In an implementation, it is observed that there are many distinguishing features among most of the character strings. For example, most of phishing websites have URL addresses constituted by disorganized characters, and only a small number of phishing websites have URL addresses with a little change from a domain name of the real website for similarity. For most legitimate websites, the URL addresses are usually constituted by some characters having special meanings, for example, characters reflecting function characteristics provided by a web page. There are also distinguishing features between a malicious network request and a normal request. Therefore, a good feature extracting model may be obtained with the Word2vec training manner.

In order to obtain the feature vector of each character in the character string, a large number of character strings are collected to form a training set, that is, a training set for the C2V model. The training set includes all categories of character strings. For example, for phishing website detection, the all categories of character strings include a phishing website and a legal website, for malicious network request detection, the all categories of character strings include a malicious network request and a normal network request, and for document classification, the all categories include all customized categories. A document may be classified in various ways, for example, by an industry, a mood, and a style of an article. In the Word2vec, each character string in the training set is used as an article in the corpus, and each character in a character string is used as a word of an article. By referring to the way of characterizing a vector of a word of the natural language in the Word2vec, a vector of each character in the character string may be characterized in the same way, thus the feature vector of the entire character string may be obtained.

The Character Embedding model is trained by using a large number of character strings in the training set in the Word2vec training manner, to obtained a trained C2V model.

The character string classification method according to the embodiment of the present disclosure may be applied to phishing website detection.

Figure 3:
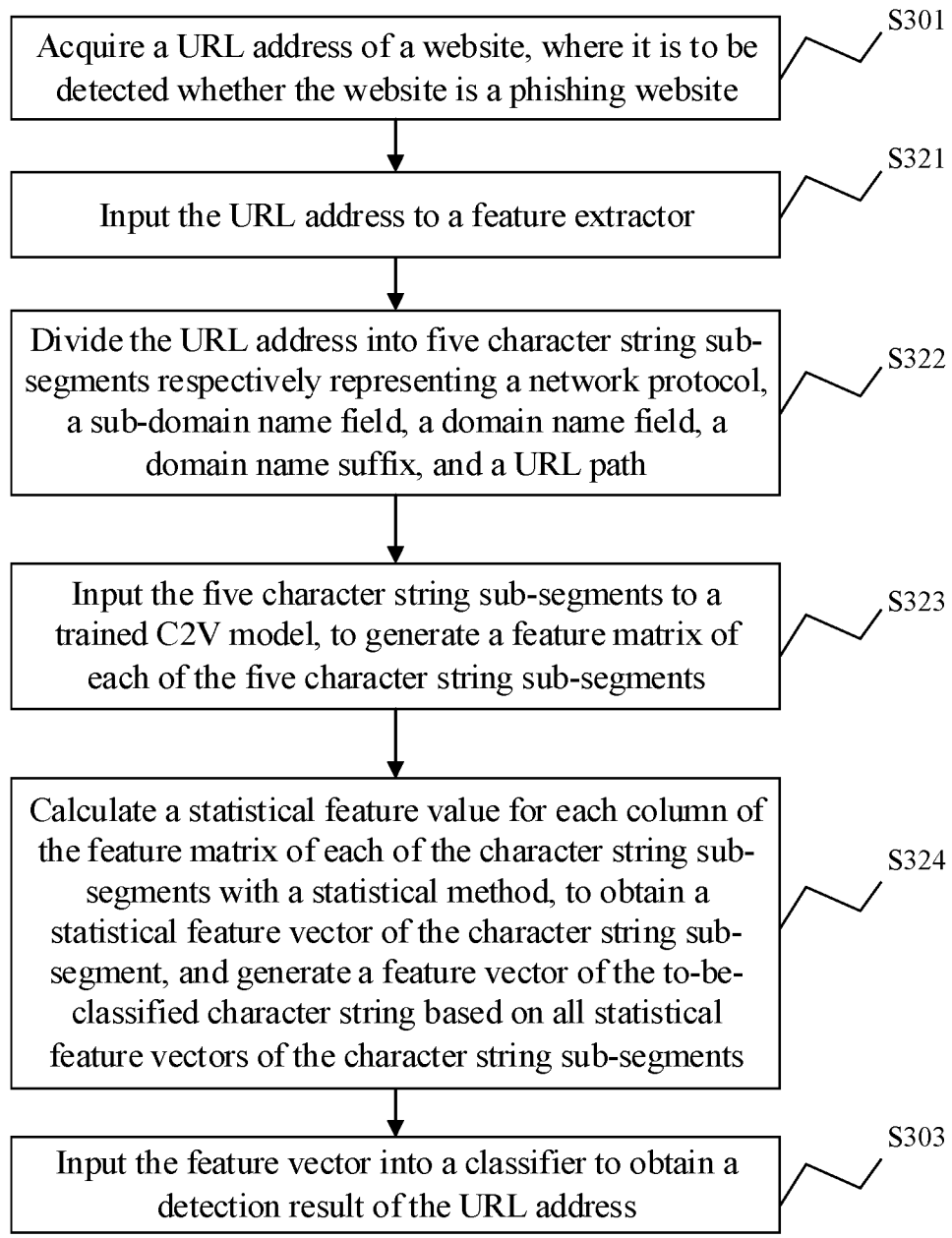
FIG. 3 is a flow chart of a character string classification method according to a specific embodiment of the present disclosure.

Reference is made to FIG. 3, which is a flow chart of a character string classification method according to a specific embodiment of the present disclosure. As shown in FIG. 3, the character string classification method includes the following steps S301, S321 to S324, and S303.

In S301, a URL address of a website is acquired, where it is to be detected whether the website is a phishing website.

In S321, the URL address is inputted to a feature extractor.

In S322, the feature extractor divides the URL address into five character string sub-segments respectively representing a network protocol, a sub-domain name field, a domain name field, a domain name suffix, and a URL path.

For a normal website, in order to attract interest of users and increase the popularity of its brand, the name of the brand is usually used as a domain name in the URL address, which is simple and clear without any unnecessary suffix. However, for most phishing websites, in order to reduce a cost of constructing a phishing website, a cheap domain name may be used, which contains many second-level domain names. Further, a phishing attacker may specifically add a brand name of the phishing object to the host field with "." or "-" as dividing points, to make the URL address of the phishing website be similar to that of a normal website. In addition, for a large number of phishing websites, a URL addresses is set to have many levels, and a URL address of a normal website has less levels.

Figure 4:
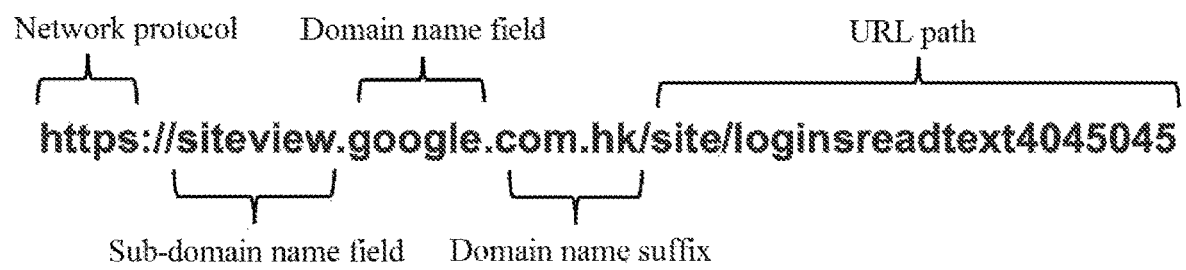
FIG. 4 is a schematic structural diagram showing a URL address division manner in a character string classification method according to the specific embodiment of the present disclosure.

In order to make the classifier better distinguish a URL address of a normal website from a URL address of a phishing website, a URL address provided by a user is divided into N URL address segments in a predetermined division manner, where N indicates a positive integer, and the division manner is not defined here. For example, if N=M=1, it is indicated that the URL address is not divided; if N=M=3, it is indicated that the URL address is divided into three segments respectively representing a network protocol, an entire domain name, and a URL path; if N=M=5, as shown in FIG. 4, the URL address is divided into five segments respectively representing a network protocol, a sub-domain name field, a domain name field, a domain name suffix, and a URL path. The domain name suffix indicates a Top Level Domain (TLD), such as ".com", ".net", ".cn", ".com.cn", ".net.cn". If the URL address does not contain a certain segment of the above, the position of this segment may be complemented with other characters, such as "0" or "null".

According to a structure of the URL address, the URL address is divided into five segments, thus the classification accuracy of the system is greatly improved based on the information of the five segments of different levels. It is proved by experiments that an accuracy of 99.79% may be achieved with the phishing website detection method according to the embodiment of the present disclosure, while an error rate may be as low as 0.4%.

In an experiment for phishing website detection, the following data set may be used.

TABLE 1

Data set used in the experiment for phishing website detection

| Data set | Data set for training C2V | XGBST data set | |
|---|---|---|---|
| | | Training set | Test set |
| Number of phishing URL addresses | 140587 | 77480 | 32303 |
| Number of legitimate URL addressess | 144476 | 57896 | 38566 |

The following shows a result of the experiment for phishing website detection in cases of N=1, 3, and 5.

TABLE 2

Comparison among results of phishing website detection obtained in different character string division manners

| N = M | Classification correct rate/% | Error rate/% | Phishing website detection rate/% |
|---|---|---|---|
| 1 | 96.56 | 3.89 | 97.12 |
| 3 | 98.32 | 2.23 | 98.99 |
| 5 | 99.69 | 0.40 | 99.79 |

In S323, the feature extractor inputs the five character string sub-segments to a trained C2V model, to generate a feature matrix of each of the five character string sub-segments, where each row of the feature matrix represents an n-dimensional feature vector of one character in the character string sub-segment, each column of the feature matrix represents one dimension of the n-dimensional feature vector, and n indicates a positive integer.

In S324, the feature extractor calculates a statistical feature value for each column of the feature matrix of each of the five character string sub-segments with a statistical method, to obtain a statistical feature vector of the character string sub-segment, and generates a feature vector of the to-be-classified character string based on all statistical feature vectors of the five character string sub-segments.

In S303, the feature vector is inputted to a classifier to obtain a detection result of the URL address.

With the character string classification method according to the embodiment of the present disclosure, it is unnecessary to acquire information of a webpage of a website during the phishing website detection process, thereby eliminating interference of a network factor on a processing time period, thus reducing the processing time period of a system. In practice, a URL may be detected during 0.21 milliseconds on average even with a PC of a low configuration, which is an order of magnitude faster than that of a conventional method in which it is required to access a webpage.

According to an embodiment of the present disclosure, the character string classification method may be applied to malicious network request detection.

Figure 5:
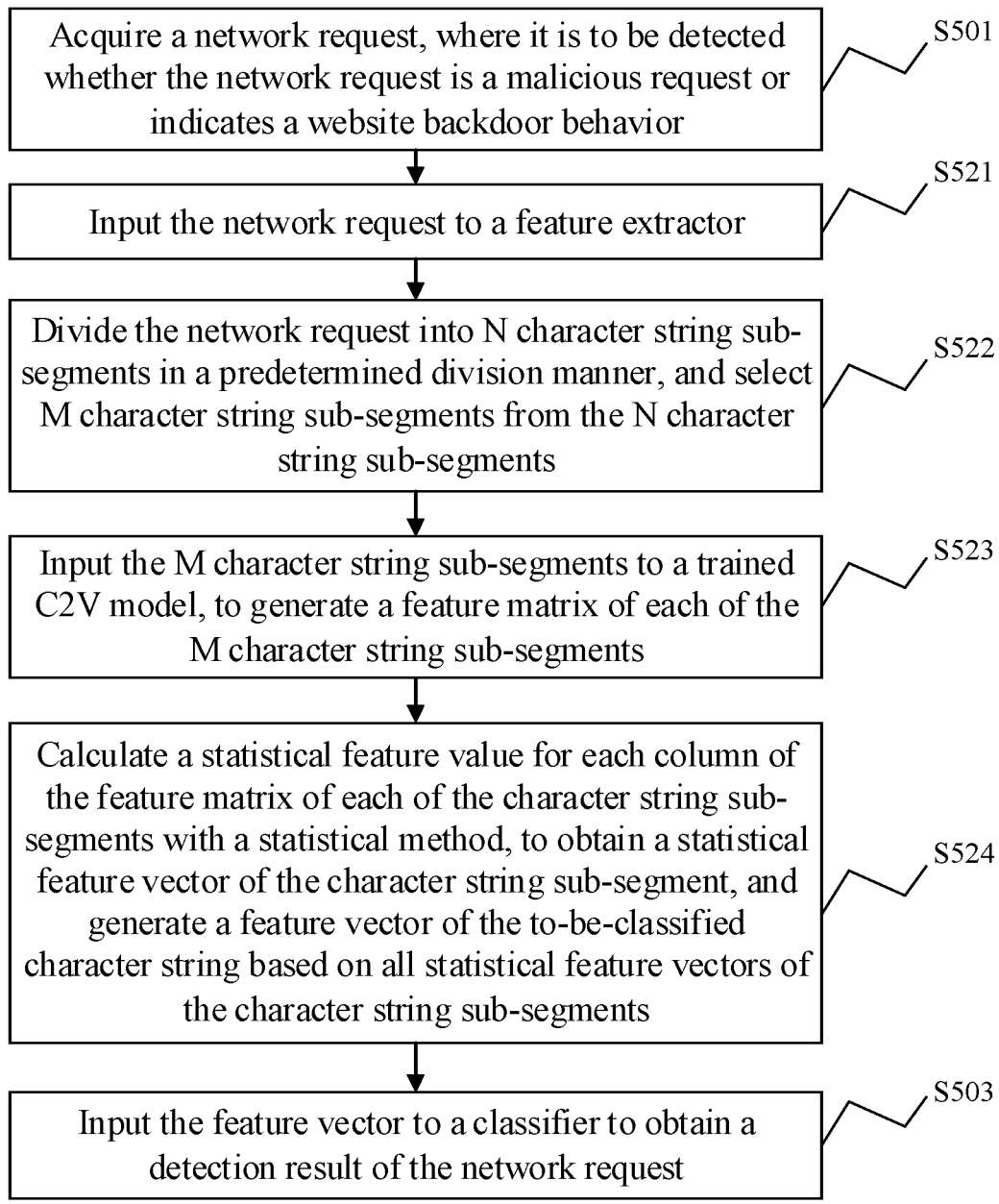
FIG. 5 is a flow chart of a character string classification method according to another specific embodiment of the present disclosure.

Reference is made to FIG. 5, which is a flow chart of a character string classification method according to another specific embodiment of the present disclosure. As shown in FIG. 5, the character string classification method includes the following steps S501, S521 to S524, and S503.

In S501, a network request is acquired, where it is to be detected where the network request is a malicious request or indicates a website backdoor behavior.

In S521, the network request is inputted to a feature extractor.

In S522, the feature extractor divides the network request into N character string sub-segments in a predetermined division manner, and selects M character string sub-segments from the N character string sub-segments, where N indicates a positive integer, and M indicates a positive integer not greater than N.

In an implementation, the network request also contains multiple fields, each of which having a respective meaning, and some of which have a more important meaning than other fields. Those skilled in the art may select character string sub-segments having more meanings to construct a feature vector based on practical experience.

The manners of division and selection of the network request is not specifically defined in the present embodiment. For example, the network request may be divided into N character string sub-segments in the predetermined division manner, and a character string sub-segment representing a request path and a character string sub-segment representing a request parameter are selected from the N character string sub-segments, where N indicates an integer not less than 2. The network request may be divided into N character string sub-segments in the predetermined division manner, and three character string sub-segments respectively representing a cookie, a path, and a domain name are selected from the N character string sub-segments, where N indicates an integer not less than 3. Further, the network request may not be divided, that is, the entire network request is used as one segment, and N=M=1.

In an experiment for malicious network request detection, the HTTP request sample data used in the 2017 China Cyber Security Technology Contest is applied, in which there are 197 legal requests and 300 malicious requests. Specifically, 118 legal requests and 183 malicious requests are used as data for training XGBST, and 79 legal requests and 117 malicious requests are used as test data. In the case of N=M=5, the classification correct rate is 84.18%, the detection accuracy rate of malicious request is 88.9%, and the error rate is 22.78%. A better effect may be achieved with an increased training set in the case of selecting an appropriate value for N.

In another experiment for detecting a website backdoor behavior from a network request, in the case of N=M=1, the classification correct rate is 97.68%, the detection rate of a backdoor behavior is 96.92%, and the error rate is 1.59%. A better effect may be achieved with an increased training set in the case of selecting an appropriate value for N.

In S523, the feature extractor inputs the M character string sub-segments to a trained C2V model, to generate a feature matrix of each of the M character string sub-segments, where each row of the feature matrix represents an n-dimensional feature vector of one character in the character string sub-segment, each column of the feature matrix represents one dimension of the n-dimensional feature vector, and n indicates a positive integer.

In S524, the feature extractor calculates a statistical feature value for each column of the feature matrix of each of the M character string sub-segments with a statistical method, to obtain a statistical feature vector of the character string sub-segment, and generates a feature vector of the to-be-classified character string based on all statistical feature vectors of the M character string sub-segments.

In S503, the feature vector is inputted to a classifier to obtain a detection result of the network request.

It is to be understood that the detection result obtained in this step indicates whether the network request is a malicious request.

The character string classification method according to the embodiment of the present disclosure may be applied to document classification.

Figure 6:
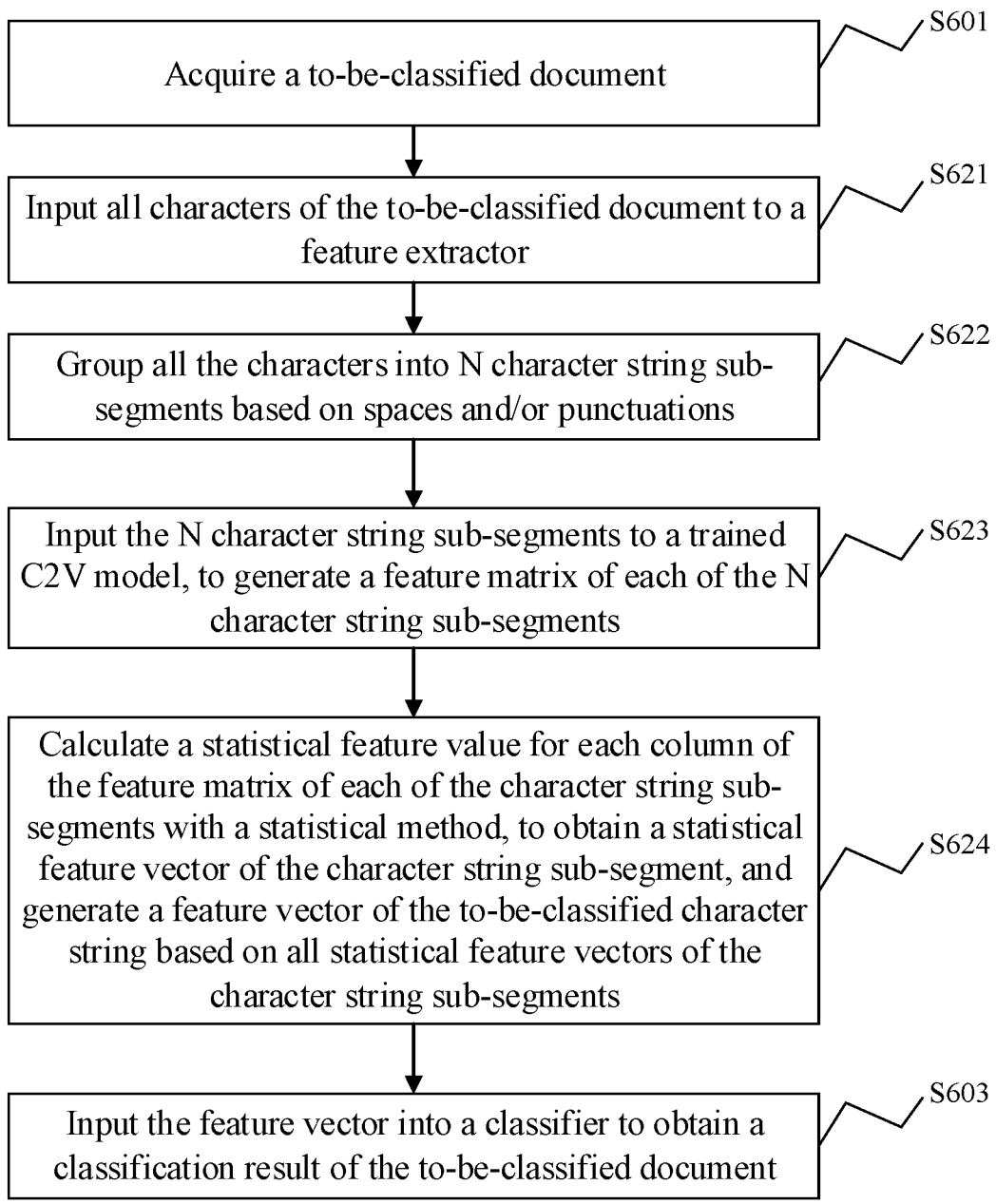
FIG. 6 is a flow chart of a character string classification method according to another specific embodiment of the present disclosure.

Reference is made to FIG. 6, which is a flow chart of a character string classification method according to another specific embodiment of the present disclosure. As shown in FIG. 6, the character string classification includes the following steps S601, S621 to S624, and S603.

In S601, a to-be-classified document is acquired.

In S621, all characters of the to-be-classified document are inputted to a feature extractor.

In S622, the feature extractor groups all the characters into N character string sub-segments based on spaces and/or punctuations, where N indicates a positive integer.

In an implementation, the whole document may be divided into different words based on spaces or punctuation. Specifically, a stop word in the document may be removed according to actual needs, and all the remaining characters are grouped into N character string sub-segments. Then, step S613 is performed.

In S623, the feature extractor inputs the N character string sub-segments to a trained C2V model, to generate a feature matrix of each of the N character string sub-segments, where each row of the feature matrix represents an n-dimensional feature vector of one character in the character string sub-segment, each column of the feature matrix represents one dimension of the n-dimensional feature vector, and n indicates a positive integer.

In S624, the feature extractor calculates a statistical feature value for each column of the feature matrix of each of the N character string sub-segments with a statistical method, to obtain a statistical feature vector of the character string sub-segment, and generates a feature vector of the to-be-classified character string based on all statistical feature vectors of the N character string sub-segments.

In S603, the feature vector is inputted to a classifier, to obtain a classification result of the to-be-classified document.

It is to be understood that the classification result obtained in this step indicates a category of the to-be-classified document.

A character string classification system according to an embodiment of the present disclosure is described below. The character string classification system described below and the character string classification method described above may be referenced to each other.

Figure 7:
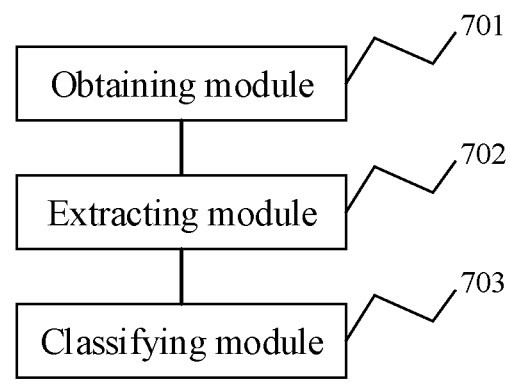
FIG. 7 is a schematic structural diagram of a character string classification system according to an embodiment of the present disclosure.

Reference is made to FIG. 7, which is a schematic structural diagram of a character string classification system according to an embodiment of the present disclosure. As shown in FIG. 7, which includes an acquiring module 701, an extracting module 702, and a classifying module 703. The acquiring module 701 is configured to acquire a to-be-classified character string. The extracting module 702 is configured to input the character string to a feature extractor to obtain a feature vector of the to-be-classified character string. The classifying module 703 is configured to input the feature vector into a classifier to obtain a classification result of the to-be-classified character string.

With the character string classification system according to the embodiment of the present disclosure, only features of a character string itself are used in the character string classification process. That is, the to-be-classified character string is directly inputted to the feature extractor to obtain the feature vector, and the classifier classifies the to-be-classified character string based on the feature vector, thereby eliminating requirement for other information associated with the character string.

Based on the above embodiment, in a preferred embodiment, the extracting module includes an inputting unit, a dividing unit, a feature unit and a generating unit. The inputting unit is configured to input the to-be-classified character string to the feature extractor. The dividing unit is configured to divide the to-be-classified character string into N character string sub-segments in a predetermined division manner, and selecting M character string sub-segments from the N character string sub-segments, where N indicates a positive integer, and M indicates a positive integer not greater than N. The feature unit is configured to input the M character string sub-segments to a trained C2V model, to generate a feature matrix of each of the M character string sub-segments, where each row of the feature matrix represents an n-dimensional feature vector of one character in the character string sub-segment, each column of the feature matrix represents one dimension of the n-dimensional feature vector, and n indicates a positive integer. The generating unit is configured to calculate a statistical feature value for each column of the feature matrix of each of the M character string sub-segments with a statistical method to obtain a statistical feature vector of the character string sub-segment, and generate the feature vector of the to-be-classified character string based on all statistical feature vectors of the M character string sub-segments.

Based on the above embodiment, in a preferred embodiment, the extracting module further includes a segmenting unit and a training unit. The segmenting unit is configured to segment all character strings in a training set into characters, and input all the characters to a character corpus. The training unit is configured to train a Character Embedding model by using the characters in the character corpus in a Word2vec training manner, to obtain the trained C2V model.

Figure 8:
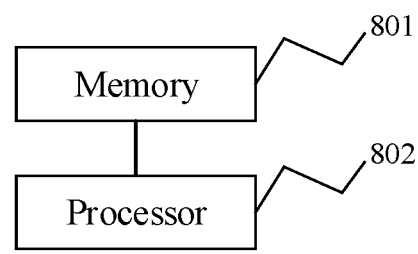
FIG. 8 is a schematic structural diagram of a character string classification device according to an embodiment of the present disclosure.

A character string classification device is further provided according to the present disclosure. Reference is made to FIG. 8, which is a schematic structural diagram of a character string classification device according to an embodiment of the present disclosure. As shown in Figure, the character string classification device includes a memory 801 and a processor 802. The memory 801 is configured to store a character string classification program. The processor 802 is configured to perform, when executes the character string classification program, steps in the above embodiments. In addition, the character string classification device may further include components such as various network interfaces and a power supply.

With the character string classification device according to the embodiment of the present disclosure, only features of a character string itself are used in the character string classification process. That is, the to-be-classified character string is directly inputted to the feature extractor to obtain the feature vector, and the classifier classifies the to-be-classified character string based on the feature vector, thereby eliminating requirement for other information associated with the character string.

A computer readable storage medium is further provided according to the present disclosure, which has a character string classification program stored thereon. The character string classification program, when executed by a processor, configures the processor to perform steps in the above embodiments. The storage medium may be any medium capable of storing program codes, such as a U disk, a mobile hard disk, a read-only memory (ROM), a random access memory (RAM), a diskette, and an optical disc.

The embodiments are described in a progressive manner in this specification, and each embodiment focuses on differences from other embodiments, and the same or similar parts of the embodiments may be referred to each other.

Based on the above description of the disclosed embodiments, those skilled in the art may implement or use the present disclosure. Apparently, many modifications may be made to the embodiments of the present disclosure by those skilled in the art. The principles defined herein may be implemented in other embodiments without departing from the spirit or scope of the present disclosure. Therefore, the present disclosure is not limited to the embodiments described herein, but complies with the broadest scope consistent with the principles and novel features disclosed herein.

The invention claimed is:

1. A character string classification method, comprising:
acquiring a to-be-classified character string;
inputting the to-be-classified character string to a feature extractor, to obtain a feature vector of the to-be-classified character string; and
inputting the feature vector to a classifier, to obtain a classification result of the to-be-classified character string,
wherein the inputting the to-be-classified character string to the feature extractor, to obtain the feature vector of the to-be-classified character string comprises:
inputting the to-be-classified character string to the feature extractor;
dividing, by the feature extractor, the to-be-classified character string into N character string sub-segments in a predetermined division manner, and selecting, by the feature extractor, M character string sub-segments from the N character string sub-segments, wherein N indicates a positive integer, and M indicates a positive integer not greater than N;
inputting, by the feature extractor, the M character string sub-segments to a trained C2V model, to generate a feature matrix of each of the M character string sub-segments, wherein each row of the feature matrix represents an n-dimensional feature vector of one character in the character string sub-segment, each column of the feature matrix represents one dimension of the n-dimensional feature vector, and n indicates a positive integer; and
calculating, by the feature extractor, a statistical feature value for each column of the feature matrix of each of the M character string sub-segments with a statistical method, to obtain a statistical feature vector of the character string sub-segment, and generating, by the feature extractor, the feature vector of the to-be-classified character string based on all statistical feature vectors of the M character string sub-segments.

2. The character string classification method according to claim 1, wherein the statistical method comprises at least one of a mean value calculating method, a standard deviation calculating method, and a median calculating method.

3. The character string classification method according to claim 1, wherein the generating the feature vector of the to-be-classified character string based on all the statistical feature vectors of the M character string sub-segments comprises:
linking all the statistical feature vectors in series to generate the feature vector of the to-be-classified character string.

4. The character string classification method according to claim 1, wherein before the inputting the M character string sub-segments to the trained C2V model, the character string classification method further comprises:
segmenting all character strings in a training set into characters, and inputting all the characters to a character corpus; and
training a Character Embedding model by using the characters in the character corpus in a Word2vec training manner, to obtain the trained C2V model.

5. The character string classification method according to claim 1, wherein in a case that the to-be-classified character string represents a URL address of a website and it is to be detected whether the website is a phishing website, and N is 5, the dividing the to-be-classified character string into the N character string sub-segments in the predetermined division manner comprises:
dividing the URL address into five character string sub-segments respectively representing a network protocol, a sub-domain name field, a domain name field, a domain name suffix, and a URL path.

6. The character string classification method according to claim 1, wherein in a case that the to-be-classified character string represents a network request and it is to be detected whether the network request is a malicious request or indicates a website backdoor behavior, and M is 2, the dividing the to-be-classified character string into the N character string sub-segments in the predetermined division manner and selecting the M character string sub-segments from the N character string sub-segments comprises:

dividing the network request into the N character string sub-segments in the predetermined division manner, and selecting a character string sub-segment representing a request path and a character string sub-segment representing a request parameter from the N character string sub-segments, wherein N indicates an integer not less than 2.

7. The character string classification method according to claim 1, wherein in a case that the to-be-classified character string represents a network request and it is to be detected whether the network request is a malicious request or indicates a website backdoor behavior, the inputting the to-be-classified character string to the feature extractor to obtain the feature vector of the to-be-classified character string comprises:

inputting the network request to a trained C2V model, to generate a feature matrix of the network request.

8. The character string classification method according to claim 1, wherein in a case that the to-be-classified character string represents a to-be-classified document, the inputting the to-be-classified character string to the feature extractor comprises:

inputting all characters of the to-be-classified document to the feature extractor.

9. The character string classification method according to claim 8, wherein the dividing the to-be-classified character string into the N character string sub-segments in the predetermined division manner comprises:

grouping all the characters into N character string sub-segments based on spaces and/or punctuations.

10. The character string classification method according to claim 1, wherein the classifier is trained through a machine learning algorithm.

11. The character string classification method according to claim 10, wherein the machine learning algorithm comprises at least one of an XGBoost algorithm, a GBDT algorithm, or a neural network algorithm.

12. A character string classification device, comprising:

a memory configured to store a character string classification program; and a processor configured to perform, when executes the character string classification program, steps of a character string classification method, wherein the character string classification method comprises:

acquiring a to-be-classified character string;

inputting the to-be-classified character string to a feature extractor, to obtain a feature vector of the to-be-classified character string; and inputting the feature vector to a classifier, to obtain a classification result of the to-be-classified character string, wherein the inputting the to-be-classified character string to the feature extractor, to obtain the feature vector of the to-be-classified character string comprises:

inputting the to-be-classified character string to the feature extractor;

dividing, by the feature extractor, the to-be-classified character string into N character string sub-segments in a predetermined division manner, and selecting, by the feature extractor, M character string sub-segments from the N character string sub-segments, wherein N indicates a positive integer, and M indicates a positive integer not greater than N;

inputting, by the feature extractor, the M character string sub-segments to a trained C2V model, to generate a feature matrix of each of the M character string sub-segments, wherein each row of the feature matrix represents an n-dimensional feature vector of one character in the character string sub-segment, each column of the feature matrix represents one dimension of the n-dimensional feature vector, and n indicates a positive integer; and calculating, by the feature extractor, a statistical feature value for each column of the feature matrix of each of the M character string sub-segments with a statistical method, to obtain a statistical feature vector of the character string sub-segment, and generating, by the feature extractor, the feature vector of the to-be-classified character string based on all statistical feature vectors of the M character string sub-segments.

13. A computer readable storage medium, having a character string classification program stored thereon, wherein the character string classification program, when executed by a processor, configures the processor to perform a character string classification method, wherein the character string classification method comprises:

acquiring a to-be-classified character string;

inputting the to-be-classified character string to a feature extractor, to obtain a feature vector of the to-be-classified character string; and inputting the feature vector to a classifier, to obtain a classification result of the to-be-classified character string, wherein the inputting the to-be-classified character string to the feature extractor, to obtain the feature vector of the to-be-classified character string comprises:

inputting the to-be-classified character string to the feature extractor;

dividing, by the feature extractor, the to-be-classified character string into N character string sub-segments in a predetermined division manner, and selecting, by the feature extractor, M character string sub-segments from the N character string sub-segments, wherein N indicates a positive integer, and M indicates a positive integer not greater than N;

inputting, by the feature extractor, the M character string sub-segments to a trained C2V model, to generate a feature matrix of each of the M character string sub-segments, wherein each row of the feature matrix represents an n-dimensional feature vector of one character in the character string sub-segment, each column of the feature matrix represents one dimension of the n-dimensional feature vector, and n indicates a positive integer; and calculating, by the feature extractor, a statistical feature value for each column of the feature matrix of each of the M character string sub-segments with a statistical method, to obtain a statistical feature vector of the character string sub-segment, and generating, by the feature extractor, the feature vector of the to-be-classified character string based on all statistical feature vectors of the M character string sub-segments.

* * * * *